US012240706B2

(12) United States Patent
Andrade et al.

(10) Patent No.: US 12,240,706 B2
(45) Date of Patent: Mar. 4, 2025

(54) CONVEYOR BELT THICKNESS MEASUREMENT SYSTEMS AND METHODS FOR DETECTING CHANGES IN CONVEYOR BELT THICKNESSES

(71) Applicant: Martin Engineering Company, Neponset, IL (US)

(72) Inventors: Italo Andrade, Belo Horizonte (BR); Henrique Canaverde, Belo Horizonte (BR); Luiz Machado, Belo Horizonte (BR); Paul Harrison, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 226 days.

(21) Appl. No.: 17/872,554

(22) Filed: Jul. 25, 2022

(65) Prior Publication Data

US 2023/0092684 A1 Mar. 23, 2023

Related U.S. Application Data

(60) Provisional application No. 63/245,505, filed on Sep. 17, 2021.

(51) Int. Cl.
*B65G 43/02* (2006.01)
*G01B 11/06* (2006.01)

(52) U.S. Cl.
CPC ............. *B65G 43/02* (2013.01); *G01B 11/06* (2013.01); *B65G 2203/041* (2013.01)

(58) Field of Classification Search
CPC ............ B65G 43/02; B65G 2203/0275; B65G 2203/041; G01B 11/06; G01B 11/0691;
(Continued)

(56) References Cited

U.S. PATENT DOCUMENTS 8,127,918 B2 * 3/2012 Warner ................. B65G 43/02
198/840
8,657,105 B2 * 2/2014 Twigger ................ B65G 43/02
198/810.01
(Continued)

FOREIGN PATENT DOCUMENTS

CN 203997933 U 12/2014
CN 105083913 A 11/2015
(Continued)

OTHER PUBLICATIONS

International Search Report and Written Opinion dated Mar. 2, 2023 in related PCT Application No. PCT/US2022/041327 filed Aug. 24, 2022.
(Continued)

*Primary Examiner* — Mark A Deuble
(74) *Attorney, Agent, or Firm* — Dinsmore & Shohl LLP (57) ABSTRACT

A method includes emitting a laser including a plurality of laser points onto a surface of a conveyor belt, capturing a plurality of first images of the surface of the conveyor belt during a first cycle of the conveyor belt, creating a first three-dimensional image of the surface of the conveyor belt during the first cycle, each of a plurality of locations of the surface of the conveyor belt in the first three-dimensional image being assigned first position data, capturing a plurality of second images of the surface of the conveyor belt during a second cycle of the conveyor belt; creating a second three-dimensional image of the surface during the second cycle, each of the plurality of locations of the surface in the second three-dimensional image being assigned second position data; and determining whether a difference between the first and second position data exceeds a predetermined threshold.

20 Claims, 8 Drawing Sheets

(58) Field of Classification Search
CPC ............ G01B 11/2522; G01B 2210/42; G01B 2210/44
USPC ......................................... 198/810.01–810.2
See application file for complete search history.

(56) References Cited

U.S. PATENT DOCUMENTS

| | | | |
|---|---|---|---|
| 9,325,888 B2 * | 4/2016 | Hoffmann | H04N 23/56 |
| 9,702,853 B2 * | 7/2017 | Wallace | B65G 15/30 |
| 2003/0168317 A1 | 9/2003 | Fromme et al. | |

FOREIGN PATENT DOCUMENTS

| | | |
|---|---|---|
| CN | 104129616 B | 6/2016 |
| CN | 111717617 A | 9/2020 |
| CN | 211945113 U | 11/2020 |
| CN | 112623667 A | 4/2021 |
| WO | WO-2019188718 A1 * | 10/2019 |

OTHER PUBLICATIONS

Pouramini. "A Machine Vision System for Defect Detection of a Traveling Grate Conveyor" 1063-1066.'2015 2nd International Conference on Knowledge-Based Engineering and Innovation (KBEI). Nov. 5, 2015; Entire Document; DOI: 10.1109/KBEI.2015.7436192.

* cited by examiner

CONVEYOR BELT THICKNESS MEASUREMENT SYSTEMS AND METHODS FOR DETECTING CHANGES IN CONVEYOR BELT THICKNESSES

CROSS-REFERENCE TO RELATED APPLICATION

This application claims the benefit of U.S. Provisional Patent Application No. 63/245,505, filed Sep. 17, 2021, for "CONVEYOR BELT THICKNESS MEASUREMENT SYSTEMS AND METHODS FOR DETECTING CHANGES IN CONVEYOR BELT THICKNESSES," which is hereby incorporated by reference in its entirety including the drawings.

TECHNICAL FIELD

The present specification generally relates to systems and methods for detecting defects in a surface of a conveyor belt and, more specifically, systems and methods for detecting and comparing thicknesses of a conveyor belt to previously detected thicknesses of the conveyor belt.

BACKGROUND

Conveyor belts are used in automated equipment for the transport of products in various environments. These conveyor belts can suffer defects, such as rips and ruptures, due to several reasons, which may result in accidents and the shutdown of an entire production line. Therefore, systems for detecting a thickness of the conveyor belt may be utilized to anticipate maintenance of the conveyor belt prior to a defect occurring. Currently, systems for detecting a thickness of a conveyor belt may include ultrasound sensors. However, ultrasound sensors are problematic with the presence of dust and water. Alternative systems may utilize mobile rollers that detect changes in a thickness of the conveyor belt based on their vertical displacement. However, these systems require direct contact with the conveyor belt and are affected by vibrations during operation of the conveyor belt. Alternative solutions may include systems utilizing a magnetic field or x-ray systems to check conveyor belt thicknesses, but these systems are not suitable for conveyor belts without a metallic structure and may produce false alarms.

Accordingly, a need exists for improved systems and methods for detecting changes in a thickness of a conveyor belt that address the disadvantages of the above current solutions.

SUMMARY

In one embodiment, a method for detecting a defect in a conveyor belt includes: emitting a laser including a plurality of laser points from a laser device onto a surface of a conveyor belt; capturing a plurality of first images of the surface of the conveyor belt by an imaging device during a first cycle of the conveyor belt; creating a first three-dimensional image of the surface of the conveyor belt during the first cycle based on the plurality of first images captured by the imaging device, each of a plurality of locations of the surface of the conveyor belt in the first three-dimensional image being assigned first position data; capturing a plurality of second images of the surface of the conveyor belt by the imaging device during a second cycle of the conveyor belt; creating a second three-dimensional image of the surface of the conveyor belt during the second cycle based on the plurality of second images captured by the imaging device, each of the plurality of locations of the surface of the conveyor belt in the second three-dimensional image being assigned second position data; and determining whether a difference between the first position data and the second position data of one or more of the plurality of locations of the surface of the conveyor belt exceeds a predetermined threshold.

In another embodiment, a method for measuring a thickness of a conveyor belt includes: emitting a first laser providing a plurality of first laser points from a first laser device onto a first surface of the conveyor belt; detecting a first distance between each of the plurality of first laser points on the first surface of the conveyor belt and a first imaging device; emitting a second laser providing a plurality of second laser points from a second laser device onto a second surface of the conveyor belt opposite the first surface of the conveyor belt; detecting a second distance between each of the plurality of second laser points on the second surface of the conveyor belt and a second imaging device; and determining whether a sum of the first distance and the second distance of at least one of the first laser point and a corresponding second laser point exceeds a threshold distance.

In yet another embodiment, a conveyor belt thickness measurement system includes: a first laser device emitting a plurality of first laser points onto a first surface of a conveyor belt; a first imaging device determining a first distance between the plurality of first laser points and the first imaging device; a second laser device emitting a plurality of second laser points on a second surface of the conveyor belt opposite the first surface of the conveyor belt; a second imaging device determining a second distance between the plurality of second laser points and the second imaging device; and a controller configured to: determine whether a sum of the first distance and the second distance of at least one of the first laser point and a corresponding second laser point exceeds a threshold distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to methods and systems for detecting a defect on a surface of a conveyor belt based on a change in a detected thickness of the conveyor belt. The systems and methods include utilizing a first laser device and a first imaging device to generate a three-dimensional image of a first surface of the conveyor belt and comparing three-dimensional images of the conveyor belt created during subsequent cycles of the conveyor belt to determine a change in thickness of the conveyor belt. Various embodiments of the methods and systems are described in more detail herein. Whenever possible, the same reference numerals will be used throughout the drawings to refer to the same or like parts.

Figure 1:
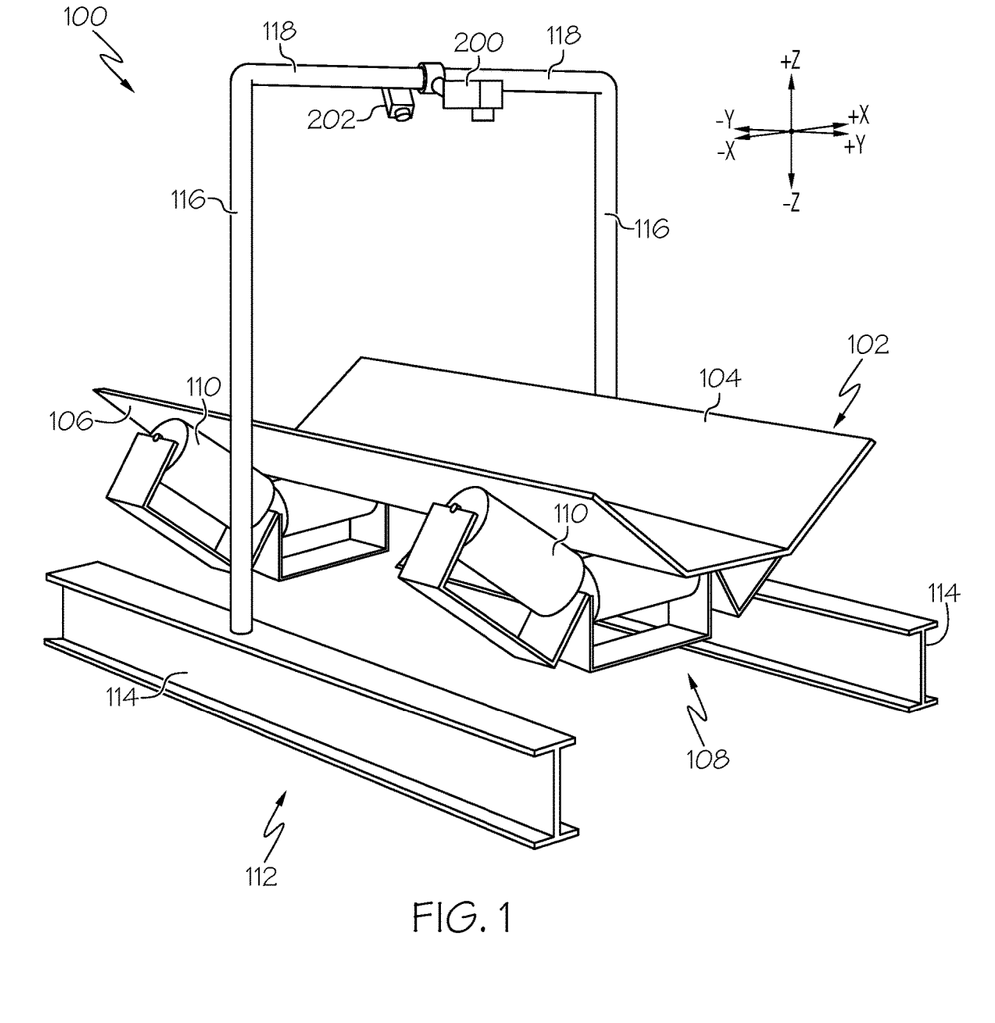
FIG. 1 schematically depicts a perspective view of a conveyor belt assembly, according to one or more embodiments shown and described herein.

Referring now to FIG. 1, a conveyor belt assembly 100 is shown including a conveyor belt 102 having a first surface 104 and a second surface 106 opposite the first surface 104. It should be appreciated that the conveyor belt 102 may be used for transporting material or product positioned on the first surface 104 from one location to another.

The conveyor belt assembly 100 includes a support system 108 provided at the second surface 106 of the conveyor belt 102 for supporting the conveyor belt 102. As shown, in embodiments, the support system 108 includes a plurality of rollers 110 for facilitating movement of the conveyor belt 102. In embodiments, the rollers 110 may be controlled by a motor or the like. In other embodiments, the rollers 110 may be passively operated to rotate as the conveyor belt 102 passes over the rollers 110. In other embodiments, the rollers 110 may be rotatably fixed such that the rollers 110 do not rotate as the conveyor belt 102 traverses the rollers 110. Rather, the rollers 110 merely define a contour of the conveyor belt 102. Specifically, the rollers 110 may be arranged such that opposite side wall portions of the conveyor belt 102 are inclined relative to a central wall portion of the conveyor belt 102. It should be appreciated that support system 108 disclosed herein is depicted for illustrative purposes only and other support systems are within the scope of the present disclosure.

In embodiments, the conveyor belt assembly 100 also includes a mounting assembly 112. As shown, the mounting assembly 112 may include one or more rails 114 positioned on opposite sides of the conveyor belt 102, and a frame including a vertical bar 116 extending from each of the rails 114 and a connecting bar 118 extending between the vertical bars 116 and over the first surface 104 of the conveyor belt 102. As discussed in more detail herein, the connecting bar 118 is used for mounting various components of a conveyor belt thickness measurement system, for example, a first laser device 200 and a first imaging device 202, described in more detail herein, above the conveyor belt 102 for identifying the presence of a defect formed in the first surface 104 of the conveyor belt 102. It should be appreciated that mounting assembly 112 disclosed herein is depicted for illustrative purposes only and other mounting systems are within the scope of the present disclosure.

As used herein, the term "defect" may refer to any abnormality in the conveyor belt 102, for example, localized wear in the first surface 104 of the conveyor belt 102 resulting in a reduced thickness of the conveyor belt 102 at a particular location. However, it should be appreciated that the conveyor belt thickness measurement system discussed herein may be suitable for detecting increases in a thickness of the conveyor belt 102, which may be indicative of material or an object being stuck to the first surface 104 of the conveyor belt 102.

Figure 2:
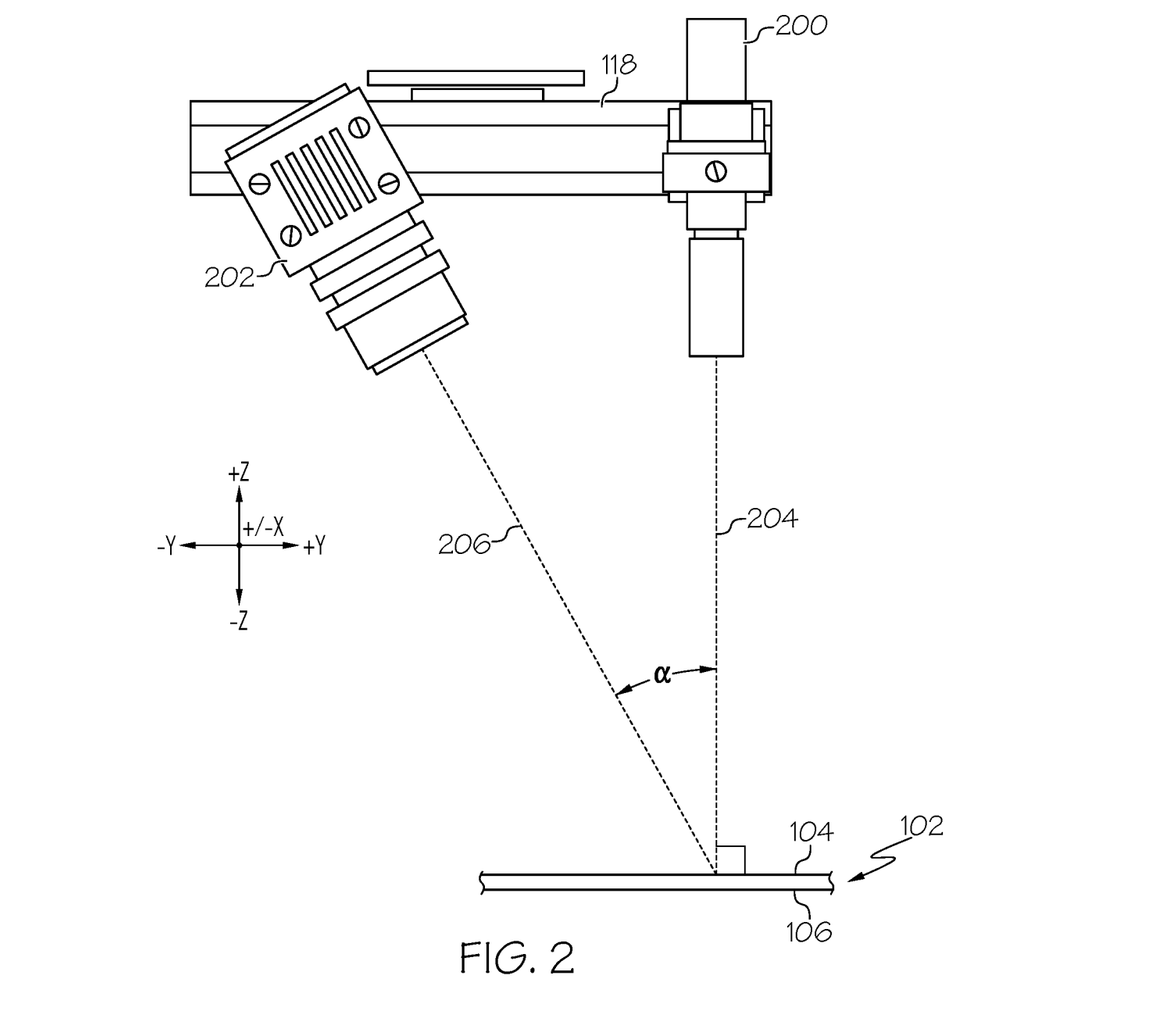
FIG. 2 schematically depicts side view of a first laser device and a first imaging device of a conveyor belt thickness measurement system directed at a first surface of a conveyor belt, according to one or more embodiments shown and described herein.

Referring now to FIG. 2, a first laser device 200 and a first imaging device 202 are shown mounted at the connecting bar 118 above the conveyor belt 102. The first laser device 200 and the first imaging device 202 may be mounted in any suitable manner such as, for example, an adjustable bracket so that the angle at which the first laser device 200 and the first imaging device 202 are oriented at the first surface 104 of the conveyor belt 102 may be adjusted. As shown, the first laser device 200 is mounted to the connecting bar 118 and arranged to emit a laser 204 toward the first surface 104 of the conveyor belt 102 and perpendicular thereto. Further, in embodiments, the first laser device 200 is configured to emit the laser 204 to extend across an entire width of the first surface 104 of the conveyor belt 102. As such, the laser 204 emitted by the first laser device 200 contacts the first surface 104 of the conveyor belt 102 and extends in a width direction, i.e., +/−X direction, across the conveyor belt 102, which is perpendicular to a longitudinal direction of the conveyor belt 102 extending along a moving direction of the conveyor belt 102.

Further, as shown, the first imaging device 202 is mounted to the connecting bar 118 and oriented at an angle α arranged to capture an image of the first surface 104 of the conveyor belt 102. The angle α is defined by an angle between a viewing line 206 of the first imaging device 202 and the laser 204 emitted by the first laser device 200. In embodiments, the angle α at which the first imaging device 202 is oriented relative to the first laser device 200 and the first surface 104 of the conveyor belt 102 is between 10 degrees and 45 degrees. In embodiments, the angle α at which the first imaging device 202 is oriented relative to the first laser device 200 and the first surface 104 of the conveyor belt 102 is between 20 degrees and 30 degrees. By orienting the first imaging device 202 at the angle α relative to the laser 204, a distance between a laser point provided on the first surface 104 of the conveyor belt 102 and the first imaging device 202 may be determined using trigonometry. More specifically, the distance may be determined based on a known starting height of the first imaging device 202 relative to the conveyor belt 102 and the angle α of the first imaging device 202.

However, it should be appreciated that, in embodiments, the first imaging device 202 may be arranged to have a viewing direction parallel to the laser 204 emitted from the first laser device 200 such that the angle α is substantially zero degrees. In such an embodiment, the first imaging device 202 may be a laser distance meter such that a distance of the laser point provided on the first surface 104 of the conveyor belt 102 is determined regardless of an angular orientation of the first imaging device 202.

Figure 3:
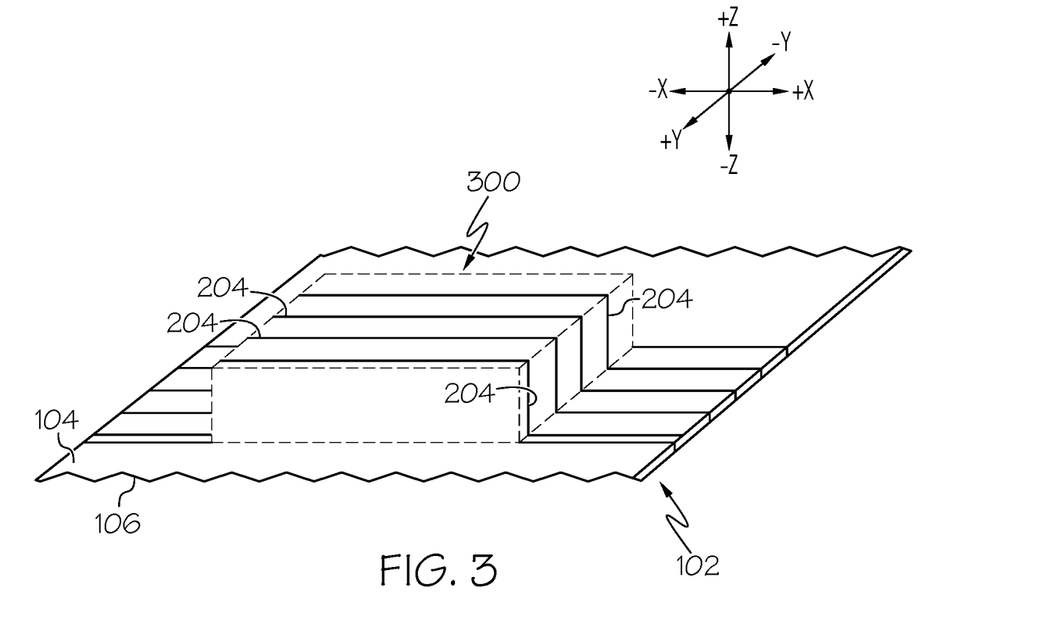
FIG. 3 schematically depicts an exemplary perspective view of a laser contacting the first surface of the conveyor belt and an object positioned thereon, according to one or more embodiments shown and described herein.

It should be appreciated that the first laser device 200 emits the laser 204 at the first surface 104 of the conveyor belt 102 and images are continually captured by the first imaging device 202, which is directed at the first surface 104 of the conveyor belt 102, to create a three-dimensional image of the conveyor belt 102. As shown in FIG. 3, an example situation is illustrated in which the laser 204 contacts the first surface 104 of the conveyor belt 102 as well as an object 300 provided on the first surface 104 of the conveyor belt 102 causing a deviation in the path of the laser 204. As discussed herein, the "defect" on the surface of the conveyor belt may be a tear or indentation formed in the first surface 104 of the conveyor belt 102 or, alternatively, may be an object, such as the object 300 shown in FIG. 3 provided on the first surface 104 of the conveyor belt 102.

The deviation in the path of the laser 204, which includes a plurality of laser points contacting one or the other of the object 300 or the first surface 104 of the conveyor belt 102, indicates a change in distance of each laser point from the first imaging device 202. In embodiments, the first laser device 200 may emit a single laser 204 at any given time from the first laser device 200. However, as shown in FIG. 3, a plurality of lasers 204 are shown extending across the object 300 and the first surface 104 of the conveyor belt 102. It should be understood that FIG. 3 illustrates the laser 204 emitted onto the object 300 and the first surface 104 of the conveyor belt 102 at different times and thus at different locations along the object 300 and the first surface 104 of the conveyor belt 102 as the conveyor belt 102 moves in the moving direction. Thus, as the conveyor belt 102 moves through a first cycle, the first laser device 200 will emit the laser 204 onto each part of the first surface 104 of the conveyor belt 102, as well as the object 300, to identify a change in distance, such as an object or other defect on the first surface 104 of the conveyor belt 102.

Figure 4:
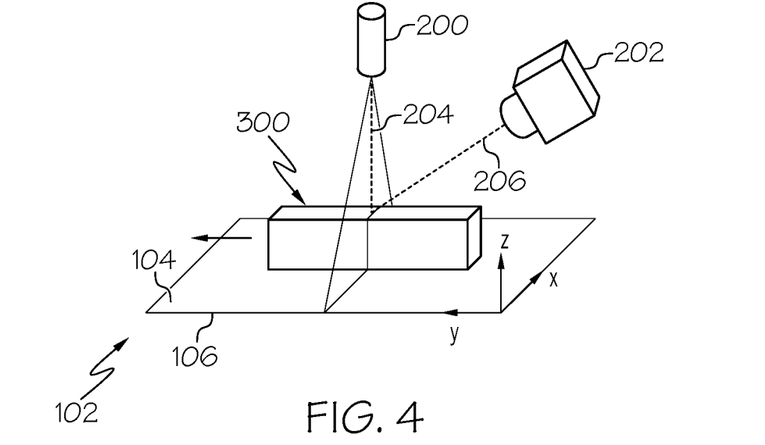
FIG. 4 schematically depicts a perspective view of a laser emitted by the first laser device contacting the first surface of the conveyor belt and the object, and the first imaging device capturing an image of the laser, according to one or more embodiments shown and described herein.

Referring now to FIG. 4, another exemplary image of the first laser device 200 emitting the laser 204 onto the first surface 104 of the conveyor belt 102, and thus the object 300 on the conveyor belt 102, is illustrated. Further, the first imaging device 202 is illustrated oriented at an angle relative to the conveyor belt 102 and the first laser device 200 for capturing an image of the laser 204 contacting the object 300 and the first surface 104 of the conveyor belt 102. As discussed herein, the first laser device 200 emits the laser 204 extending along an entire width of the first surface 104 of the conveyor belt 102. Thus, any defect may be detected, even if positioned at or near opposite sides of the conveyor belt 102. Additionally, the first imaging device 202 captures an image of the conveyor belt 102 such that a distance of the laser 204 contacting the first surface 104 of the conveyor belt 102 and the object 300 at a specific time point may be identified.

Figure 5:
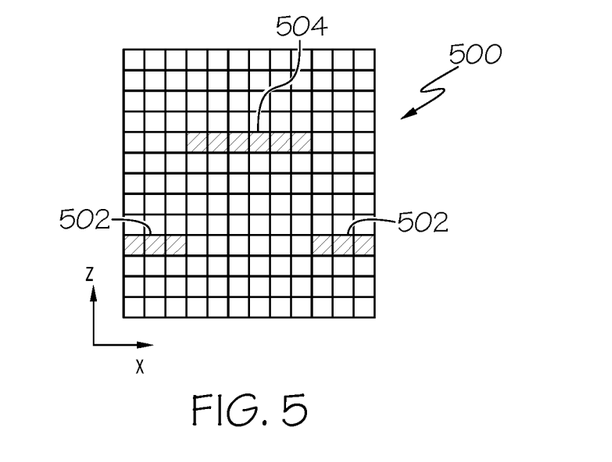
FIG. 5 schematically depicts an individual slice image indicating vertical position data of the first surface of the conveyor belt and the object as captured by the first imaging device, according to one or more embodiments shown and described herein.

Referring now to FIG. 5, an individual slice image 500 associated with an image captured by the first imaging device 202 at a specific time point is illustrated. As shown in the individual slice image 500, the deviation of the laser contacting the first surface 104 of the conveyor belt 102 and the object 300 (FIG. 4) is represented by the shaded lines. Each pixel of the shaded line represents an individual laser point contacting one or the other of the first surface 104 of the conveyor belt 102 and the object 300. For example, the plurality of laser points on outer portions 502 of the individual slice image 500 indicate the laser contacting the first surface 104 of the conveyor belt 102 and the plurality of laser points in a middle portion 504 between the outer portions 502 of the individual slice image 500 between the outer laser points indicates the laser contacting the object 300.

Each laser point is assigned first position data which includes a vertical position of the laser point, a lateral position of the laser point, and a longitudinal position of the laser point. This information is assigned to each laser point and to a position on the conveyor belt 102 such that the same position of the conveyor belt 102 may be compared with one another during various subsequent use cycles. As discussed herein, the vertical position of each laser point may be determined by the first imaging device 202. In other embodiments, the vertical position of each laser point may be determined based on a known distance of the first surface 104 of the conveyor belt 102, indicated by the outer most laser points in the individual slice image 500, and a difference between those laser points. The lateral position of each laser point may also be determined by the first imaging device 202 by identifying a distance between one of the side edges of the conveyor belt 102 and that particular laser point. The lateral position may also be determined based on a distance between the outermost laser point and the particular laser point as captured in the individual slice image 500. Lastly, the longitudinal position of each laser point may be determined based on a timestamp at which the image represented by the particular individual slice image 500 was captured by the first imaging device 202 and a known speed of the conveyor belt 102. Accordingly, the longitudinal position of the laser point may be determined relative to an initial or starting point of the conveyor belt 102.

Although only one slice image 500 is illustrated, it should be appreciated that a plurality of slice images 500 are generated based on images captured by the first imaging device 202. Thereafter, the slice images 500 are compiled to generate a three-dimensional image of the entire conveyor belt 102 during a first cycle. Specifically, the three-dimensional image indicates the distances of each laser point on the first surface 104 of the conveyor belt 102, including any defects formed or positioned thereon, at various positions of the conveyor belt 102. As discussed in more detail herein, the three-dimensional image of the conveyor belt 102 is compared to subsequently generated three-dimensional images of the conveyor belt 102 generated based on images captured by the first imaging device 202 during subsequent cycles to determine whether a distance at the first surface 104 of the conveyor belt 102 is deviating by an amount in excess of a predetermined threshold.

Figure 6:
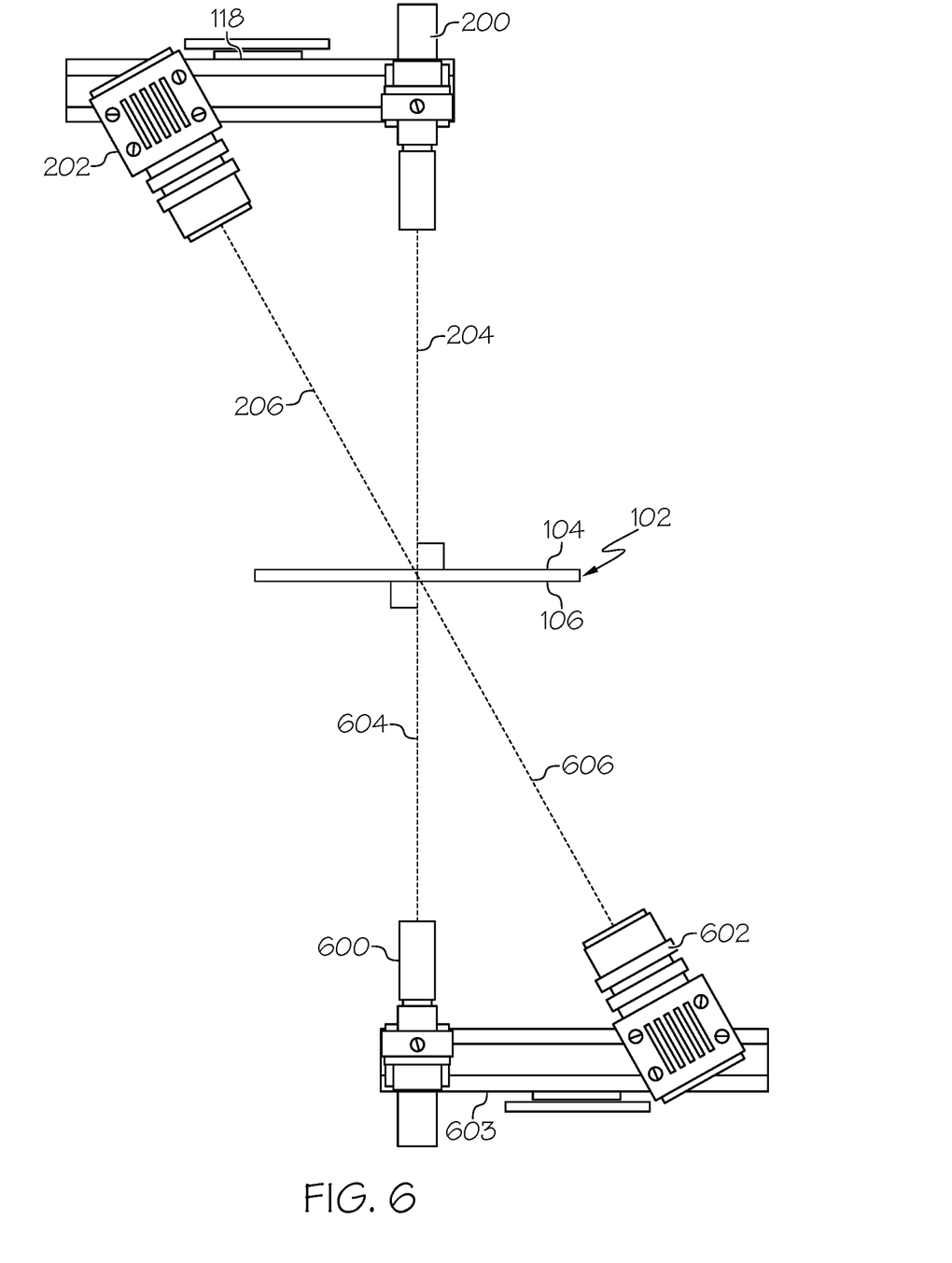
FIG. 6 schematically depicts a side view of a second laser device and a second imaging device directed at an opposite second surface of the conveyor belt, according to one or more embodiments shown and described herein.

Referring now to FIG. 6, in embodiments, a second laser device 600 and second imaging device 602 may be provided in addition to the first laser device 200 and the first imaging device 202. The second laser device 600 and the second imaging device 602 may be mounted to a support structure 603 under the conveyor belt 102. Similar to the first laser device 200 and the first imaging device 202, utilized for emitting a laser at the first surface 104 of the conveyor belt 102 and capturing images of the first surface 104 of the conveyor belt 102, respectively, the second laser device 600 operates to emit a laser 604 at the opposite second surface 106 of the conveyor belt 102 and the second imaging device 602 is directed along a viewing line 606 to capture an image of the second surface 106 of the conveyor belt 102. As discussed herein, the second laser device 600 and the second imaging device 602 are utilized to determine a distance of the second surface 106 of the conveyor belt 102 in a similar manner as that discussed herein with respect to the first laser device 200 and the first imaging device 202. Additionally, the determined distances at a particular laser point on the second surface 106 of the conveyor belt 102 are correlated to a distance of a corresponding laser point on the first surface 104 of the conveyor belt 102 to determine whether changes in the distances are actually caused by changes in one of the surfaces 104, 106, or rather by vibrations of the conveyor belt 102. For example, if a distance of one laser point on the first surface 104 of the conveyor belt 102 is determined to increase by a first amount and a distance of a corresponding laser point on the second surface 106 of the conveyor belt 102 is determined to decrease by the same first amount, this may indicate that the changes in the detected distances were the result of vibration of the conveyor belt 102 rather than an actual defect. Similarly, if a distance of one laser point on the first surface 104 of the conveyor belt 102 is determined to decrease by a first amount and a distance of a corresponding laser point on the second surface 106 of the conveyor belt 102 is determined to increase by the same first amount, this may also indicate that the changes in the detected distances were the result of vibration of the conveyor belt 102. In other embodiments, discussed in more detail herein, the first laser device 200, the first imaging device 202, the second laser device 600, and the second imaging device 602 may be utilized to determine whether a thickness of the conveyor belt 102 is being changed in real time. Specifically, when the sum of the distances of a particular laser point on the first surface 104 and a corresponding laser point on the second surface 106 exceeds a first predetermined threshold, it may be determined that wear is detected in either or both of the first surface 104 and the second surface 106 of the conveyor belt 102. Alternatively, when the sum of the distances of a particular laser point on the first surface 104 and a corresponding laser point on the second surface 106 falls below a second predetermined threshold, it may be determined that an object or material is detected on either or both of the first surface 104 and the second surface 106 of the conveyor belt 102.

Figure 7:
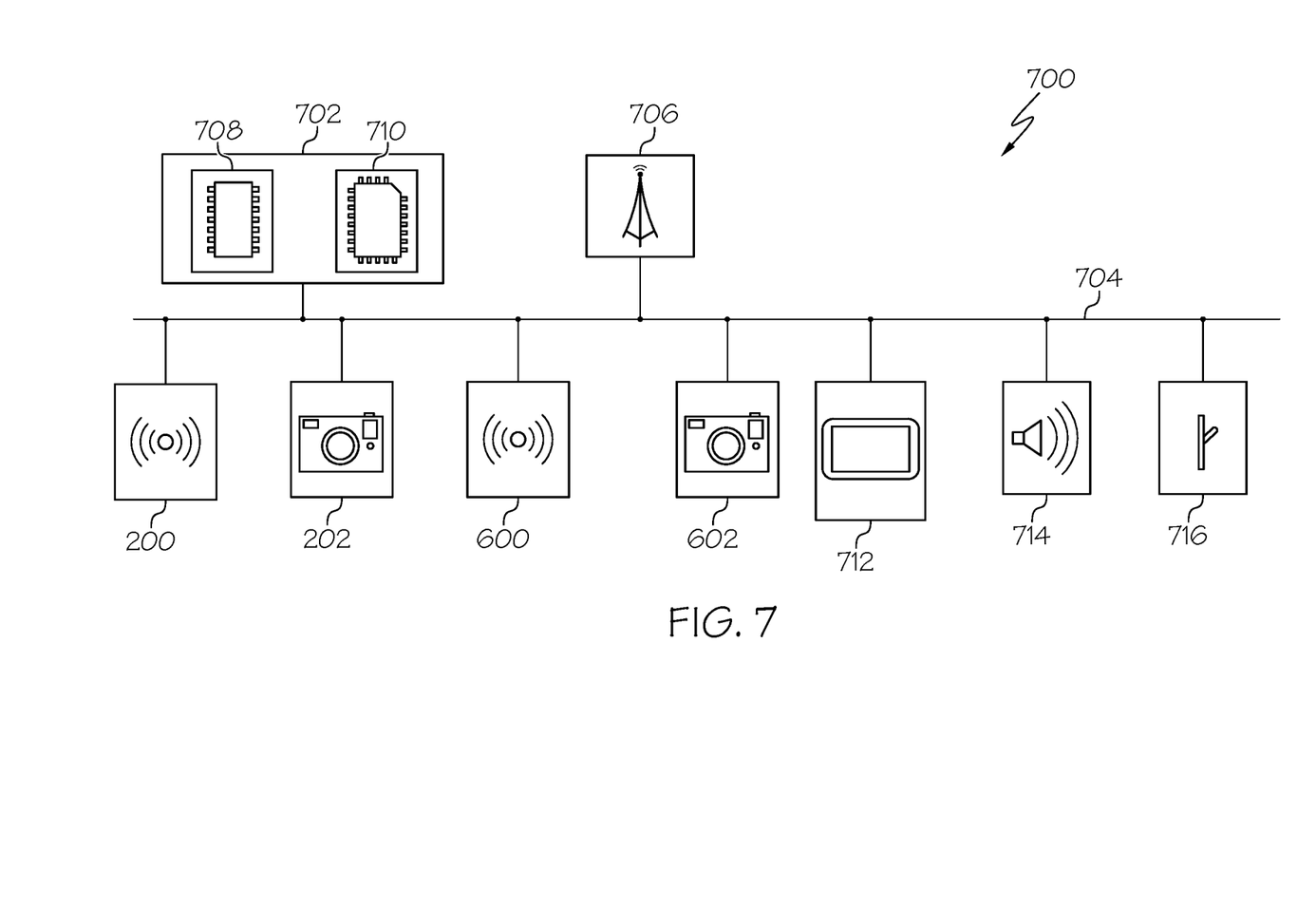
FIG. 7 schematically depicts components of the conveyor belt thickness measurement system, according to one or more embodiments shown and described herein.

Referring now to FIG. 7, a schematic diagram of the conveyor belt thickness measurement system 700 is depicted illustrating individual hardware components thereof, as discussed herein and with reference to FIGS. 1-6. In embodiments, the measurement system 700 includes a controller 702, a communication path 704, and network interface hardware 706. The communication path 704 may be formed from any medium that is capable of transmitting a signal such as, for example, conductive wires, conductive traces, optical waveguides, or the like. Moreover, the communication path 704 may be formed from a combination of mediums capable of transmitting signals. In one embodiment, the communication path 704 includes a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 704 communicatively couples the various components of the measurement system 700. As used herein, the term "communicatively coupled" means that coupled components are capable of exchanging data signals with one another such as, for example, electrical signals via conductive medium, electromagnetic signals via air, optical signals via optical waveguides, optical signals via air, i.e., air waveguides, and the like.

As noted above, the measurement system 700 includes the controller 702 including one or more processors 708 and one or more memory modules 710. Each of the one or more processors 708 may be any device capable of executing machine readable instructions. Accordingly, each of the one or more processors 708 may be an integrated circuit, a microchip, a computer, or any other computing device. The one or more processors 708 are communicatively coupled to the other components of the measurement system 700 by the communication path 704. Accordingly, the communication path 704 may communicatively couple any number of processors with one another, and allow the modules coupled to the communication path 704 to operate in a distributed computing environment. Specifically, each of the modules may operate as a node that may send and/or receive data.

Each of the one or more memory modules 710 of the measurement system 700 is coupled to the communication path 704 and communicatively coupled to the one or more processors 708. The one or more memory modules 710 may include RAM, ROM, flash memories, hard drives, or any device capable of storing machine readable instructions such that the machine readable instructions may be accessed and executed by the one or more processors 708. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 710. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As noted above, the measurement system 700 includes the network interface hardware 706 for wirelessly communicatively coupling the measurement system 700 with other communication devices, such as a central server, a mobile device, and the like. The network interface hardware 706 is coupled to the communication path 704 such that the communication path 704 communicatively couples the network interface hardware 706 to other modules of the measurement system 700. The network interface hardware 706 may be any device capable of transmitting and/or receiving data via a wireless network. Accordingly, the network interface hardware 706 may include a communication transceiver for sending and/or receiving data according to any wireless communication standard. For example, the network interface hardware 706 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 706 includes a Bluetooth® transceiver that enables the measurement system 700 to exchange information with a mobile device such as, for example, a smartphone, via Bluetooth® communication.

As discussed herein, the measurement system 700 includes the first laser device 200 and the first imaging device 202 for detecting distances to the first surface 104 of the conveyor belt 102. Additionally, in embodiments discussed herein, the measurement system 700 includes the second laser device 600 and the second imaging device 602 for detecting distances to the second surface 106 of the conveyor belt 102. The first laser device 200, the first imaging device 202, the second laser device 600, and the second imaging device 602 are communicatively coupled to the other components of the measurement system 700 via the communication path 704.

In embodiments, the measurement system 700 includes a display device 712 for providing visual output such as, for example, notifications, representations, alerts, or a combination thereof. In particular, the display device 712 provides notifications when a defect is detected on the conveyor belt 102. For example, the display device 712 may display a notification when either wear or an object is detected on the first surface 104 or the second surface 106 of the conveyor belt 102 and, in embodiments, a location of the wear or object. The display device 712 is coupled to the communication path 704 and communicatively coupled to the one or more processors 708. Accordingly, the communication path 704 communicatively couples the display device 712 to other modules of the measurement system 700. The display device 712 may include any medium capable of transmitting an optical output such as, for example, a cathode ray tube, light emitting diodes, a liquid crystal display, a plasma display, projection display, holographic display, augmented display, or the like. Moreover, the display device 712 may be a touchscreen that, in addition to providing optical information, detects the presence and location of a tactile input upon a surface of or adjacent to the display. Accordingly, the display device 712 may receive mechanical input directly upon the optical output provided by the display device 712.

In embodiments, the measurement system 700 includes a speaker 714 for transforming data signals into mechanical vibrations, such as to output audible prompts or audible information. The speaker 714 is coupled to the communication path 704 and communicatively coupled to the one or more processors 708. As such, the speaker 714 provides audible output such as, for example, notifications, alerts, or a combination thereof. In particular, the speaker 714 provides notifications when a defect is detected on the conveyor belt 102. For example, the speaker 714 may emit an alarm when either wear or an object is detected on the first surface 104 or the second surface 106 of the conveyor belt 102.

In embodiments, the measurement system 700 includes a switch 716 for controlling operation of the conveyor belt assembly 100 and, particularly, movement of the conveyor belt 102. The switch 716 is coupled to the communication path 704 and communicatively coupled to the one or more processors 708. The switch 716 may be positioned between an on state, in which operation of the conveyor belt 102 is permitted, and an off state, in which operation of the conveyor belt 102 is not permitted. It should be appreciated that the switch may be a physical switch such as, for example, a button, knob, or the like. In other embodiments, the switch may be a digital switch for receiving tactile input such as, for example, on the display device or a separate touchscreen. As described in more detail herein, the switch 716 may be positioned into the off state from the on state in response to detecting a defect on the conveyor belt 102.

Figure 8:
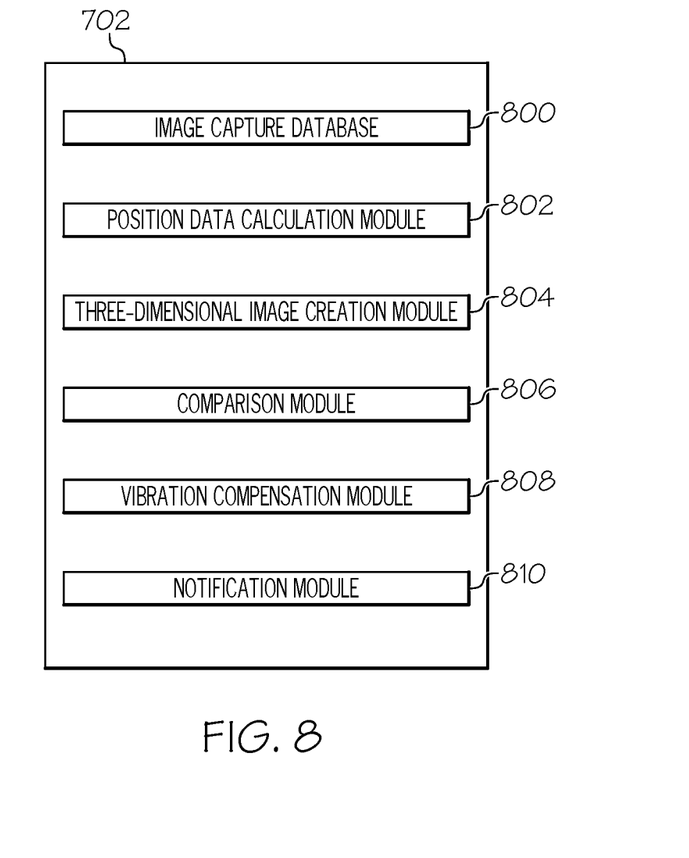
FIG. 8 schematically depicts a controller of the measurement system, according to one or more embodiments shown and described herein.

Referring now to FIG. 8, an exemplary controller 702 of the measurement system 700 is shown. In embodiments, the controller 702 includes an image capture database 800, a position data calculation module 802, a three-dimensional image creation module 804, a comparison module 806, a vibration compensation module 808, and a notification module 810.

The image capture database 800 stores each of the images captured by the first imaging device and the second imaging device. Additionally, the image capture database stores an individual image at each time the laser contacts another position of the first surface 104 of the conveyor belt 102, and in embodiments the second surface 106 of the conveyor belt 102 as captured by the second imaging device 602. As such, a plurality of images are captured of the conveyor belt 102 during a first cycle in which initial measurements are calculated of the first surface 104 of the conveyor belt 102 prior to any wear or objects being detected. This information is utilized to determine baseline distances of each laser point on the first surface 104 of the conveyor belt 102.

The position data calculation module 802 assigns position data to each laser point within each captured image. As discussed herein, the position data assigned to each laser point and thus to each area of the first surface 104 of the conveyor belt 102 may include a vertical position, a lateral position, and a longitudinal position. The position data calculation module 802 also creates a plurality of slice images may be created for each cross-section of the first surface 104 of the conveyor belt 102, as discussed herein, after calculating the vertical position, the lateral position, and the longitudinal position.

The three-dimensional image creation module 804 compiles each of the slice images generated during the first cycle and generates a three-dimensional image of the first surface 104 of the conveyor belt 102. In theory, the three-dimensional image should identify that the first surface 104 of the conveyor belt 102 is substantially flat during the first use prior to any wear or objects being detected thereon. However, it may be the case that abnormalities are detected during the first cycle and depicted in the three-dimensional image. However, this is used as a baseline and any deviation from the baseline during a subsequent cycle is calculated with reference to the baseline.

As discussed in more detail herein, a three-dimension image is created for each cycle of the conveyor belt 102. For example, a first three-dimensional image is created during the first cycle and a second three-dimensional image is created during the second cycle. The comparison module 806 will compare, such as by overlaying, the first three-dimensional image representing the first surface 104 of the conveyor belt 102 during the first cycle with the second three-dimensional image representing the first surface 104 of the conveyor belt 102 during the second cycle. It should be appreciated that the comparison module may compare the first three-dimensional image against any subsequently generated three-dimensional image such that any changes are detected with reference to the baseline or, alternatively, each three-dimensional image may be compared to an immediately previously generated three-dimensional image to detect changes in the first surface 104 of the conveyor belt 102 between two sequential cycles. More specifically, corresponding locations of the conveyor belt 102 within each of the three-dimensional images having the same lateral position and longitudinal position are matched to one another to compare vertical positions of each position during different cycles to identify a change in the vertical positions at each location.

In embodiments, as discussed herein, the second laser device 600 and the second imaging device 602 may be utilized for detecting distances to the second surface 106 of the conveyor belt 102. As such, the vibration compensation module 808 will detect similar changes between the distances detected at the first surface 104 of the conveyor belt 102 and the second surface 106 of the conveyor belt 102 to determine that any change in distance is actually caused by vibration of the conveyor belt 102 and not the presence of a defect or an object. Thus, the vibration compensation module 808 will modify the individual slice images and the three-dimensional images to take into consideration vibration of the conveyor belt 102. As discussed herein, the vibration compensation module 808 is also configured to detect increases and decreases in a thickness of the conveyor belt 102 in real time by adding the total distance between corresponding laser points on the first surface 104 of the conveyor belt 102 and the second surface 106 of the conveyor belt 102, as described herein.

The notification module 810 will activate at least one of the display device 712, the speaker 714, and the switch 716 when a defect and/or object is detected. Specifically, when a distance of a particular laser point identified in the second three-dimensional image is greater than a distance of a corresponding laser point on the first three-dimensional image by a first predetermined threshold, the notification module 810 will indicate that wear is present. The notification module 810 may specifically indicate the location of the wear on the first surface 104 of the conveyor belt 102. Additionally, when a distance of a particular laser point identified in the second three-dimensional image is less than a distance of a corresponding laser point on the first three-dimensional image by a second predetermined threshold, the notification module 810 will indicate that an object is present. The notification module may specifically indicate the location of the object on the first surface 104 of the conveyor belt 102. Alternatively or in addition thereto, the notification module 810 will activate the switch 716 to deactivate the conveyor belt assembly 100 to prevent continued movement of the conveyor belt 102 and additional damage thereto.

Figure 9:
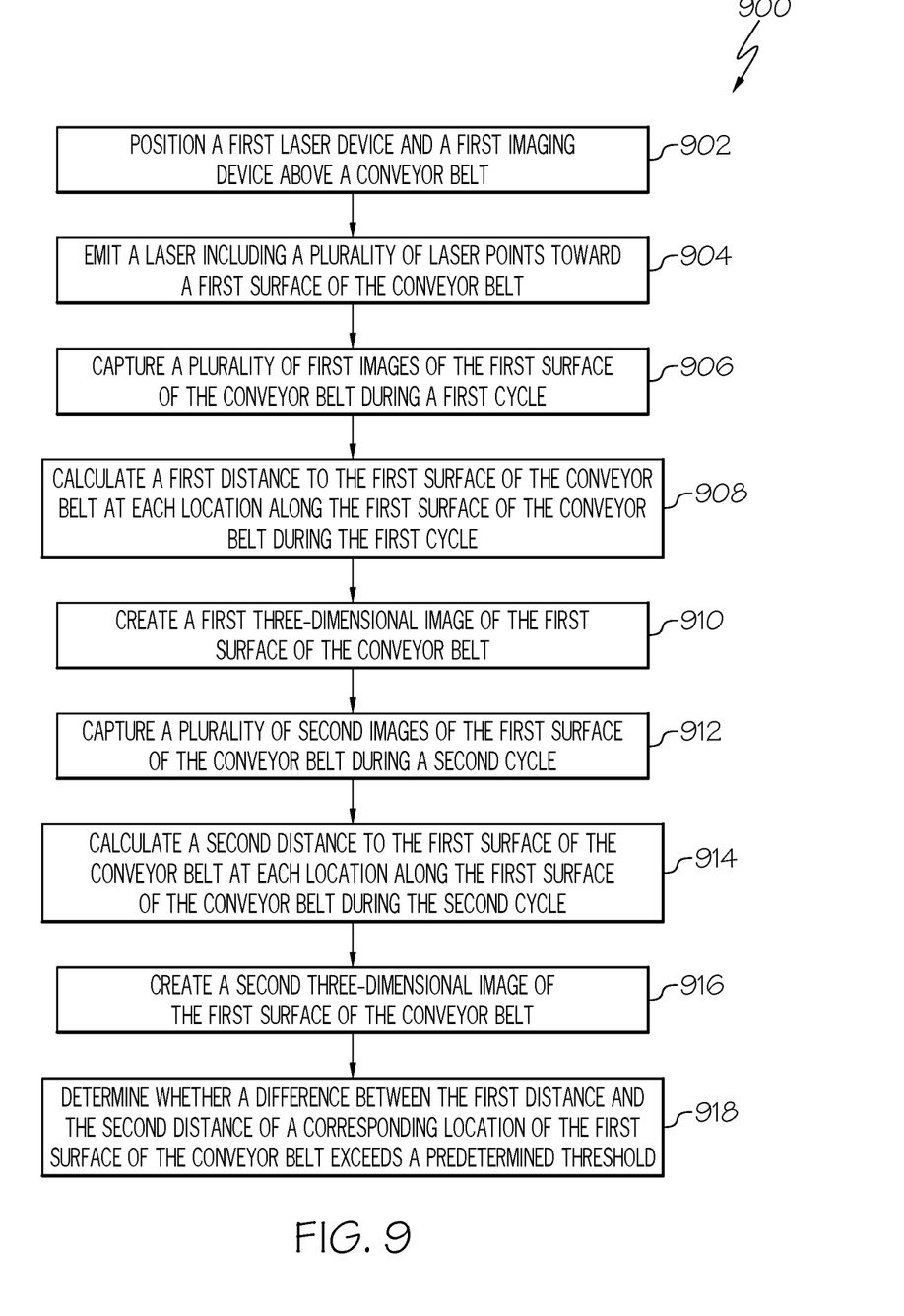
FIG. 9 schematically depicts a flowchart of a method for determining a thickness of a conveyor belt and the presence of a defect or an object on the first surface of the conveyor belt, according to one or more embodiments shown and described herein.

Referring now to FIG. 9, a method 900 is depicted for determining whether a defect or an object is present on a first surface 104 of a conveyor belt 102, and, in embodiments, whether a thickness of the conveyor belt 102 has been reduced in excess of a predetermined threshold. The method 900 is discussed with reference to the measurement system 700 and individual components thereof illustrated in FIGS. 1-8.

At step 902, the first laser device 200 and the first imaging device 202 are positioned above the conveyor belt 102, each directed at the first surface 104 of the conveyor belt 102. In embodiments, a second laser device 600 and a second imaging device 602 are positioned below the conveyor belt 102 and directed at the opposite second surface 106 of the conveyor belt 102.

At step 904, the first laser device 200 emits the laser 204 including a plurality of laser points toward the first surface 104 of the conveyor belt 102. In embodiments, the laser 204 extends across an entire width of the first surface 104 of the conveyor belt 102.

At step 906, the first imaging device 202 captures a plurality of first images of the first surface 104 of the conveyor belt 102 as the conveyor belt 102 operates in a first cycle. The first cycle refers to a complete rotation of the conveyor belt 102 from a starting position to an end position such that the plurality of first images capture images of the laser 204 at each location of the first surface 104 of the conveyor belt 102. As discussed herein, the plurality of first images are stored in the image capture database 800.

At step 908, the position data calculation module 802 assigns position data to each laser point in each of the plurality of first images. The position data includes a vertical position, a lateral position, and a longitudinal position of each laser point. This information is used to create the individual slice images indicating position data for each point along the first surface 104 of the conveyor belt 102 during the first cycle. The vertical position of each laser point calculated during the first cycle may be referred to herein as a first distance.

At step 910, the plurality of individual slice images are combined to create a first three-dimensional image of the first surface 104 of the conveyor belt 102 captured during the first cycle. As discussed herein, the first three-dimensional image may be adjusted by the vibration compensation module 808 to compensate for vibration of the conveyor belt 102 detected by the second laser device 600 and the second imaging device 602. For example, vertical positions of laser points in a particular slice image may be either increased or reduced if it is determined that the changes in vertical position is due to vibration of the conveyor belt 102. More particularly, it may be determined that the changes in vertical position is due to vibration of the conveyor belt 102 when an increase or decrease in vertical position at the first surface 104 of the conveyor belt 102 is equal to a corresponding increase or decrease in vertical position at the second surface 106 of the conveyor belt 102 detected by the second imaging device 602.

Thereafter, steps 906-910 are repeated during a subsequent second cycle of the conveyor belt 102. Specifically, at step 912, the first imaging device 202 captures a plurality of second images of the first surface 104 of the conveyor belt 102 with each second image capturing the laser 204 contacting a different portion of the first surface 104 of the conveyor belt 102. The plurality of second images are stored in the image capture database 800.

Thereafter, at step 914, the position data calculation module 802 assigns position data to each laser point in each of the plurality of second images. As with the position data of the laser points of the plurality of first images, the position data includes a vertical position, a lateral position, and a longitudinal position of each laser point. As such, individual slice images indicating position data for each point along the first surface 104 of the conveyor belt 102 during the second cycle are created. The vertical position of each laser point calculated during the second cycle may be referred to herein as a second distance.

At step 916, the plurality of individual slice images are combined to create a second three-dimensional image of the first surface 104 of the conveyor belt 102 captured during the second cycle. As discussed herein with respect to step 910, the second three-dimensional image may be adjusted by the vibration compensation module 808 to compensate for vibration of the conveyor belt 102 detected by the second laser device 600 and the second imaging device 602.

Lastly, at step 918, the first position data and the second position data of laser points on corresponding locations of the first surface 104 of the conveyor belt 102 are compared by the comparison module 806 by comparing like data points from the first three-dimensional image and the second three-dimensional image. It should be appreciated that this comparison of like data points may occur in real time. For example, as second position data is collected for each laser point during the second cycle, the second position data may be immediately compared to corresponding first position data calculated during the first cycle. Accordingly, if it is determined that the vertical distance of the second position data is greater than the vertical distance of the corresponding second position data by a predetermined threshold, the notification module 810 will activate a notification indicating that a defect has been detected at a specific location of the conveyor belt 102. As discussed herein, the notification may be a visual and/or audible alert. Alternatively, if it is determined that the vertical distance of the second position data is less than the vertical distance of the corresponding second position data by a predetermined threshold, the notification module 810 will activate a notification indicating that an object has been detected at a specific location of the conveyor belt 102.

In embodiments, the notification module 810 will also be activated to alert that the total thickness of the conveyor belt 102 has increased or decreased in excess of a predetermined threshold. For example, if the sum of the distances at a particular location on the first surface 104 of the conveyor belt 102 and a corresponding, opposite location on the second surface 106 of the conveyor belt 102 exceed a predetermined threshold, the notification module 810 will provide a notification that a defect has been detected on either the first surface 104 or the second surface 106 of the conveyor belt 102. Alternatively, if the sum of the distances at a particular location on the first surface 104 of the conveyor belt 102 and a corresponding, opposite location on the second surface 106 of the conveyor belt 102 falls below a predetermined threshold, the notification module 810 will provide a notification that an object on either the first surface 104 or the second surface 106 of the conveyor belt 102 has been detected.

It should be appreciated that the above steps may be repeated by capturing additional images of the first surface 104 of the conveyor belt 102 during subsequent cycles and comparing position data captured during the subsequent cycle to corresponding position data captured during the first cycle, the second cycle, or any other previous cycle.

From the above, it is to be appreciated that defined herein are methods and systems for detecting a defect on a surface of a conveyor belt based on a change in a detected thickness of the conveyor belt. The systems and methods include utilizing a first laser device and a first imaging device to generate a three-dimensional image of a first surface of the conveyor belt and comparing three-dimensional images of the conveyor belt created during subsequent cycles of the conveyor belt to determine a change in thickness of the conveyor belt. In embodiments, a second laser device and a second imaging device are provided under the conveyor belt to cooperate with the first laser device and the first imaging device to detect a total thickness of the conveyor belt and vibration of the conveyor belt.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for detecting a defect in a conveyor belt, the method comprising:
   emitting a laser including a plurality of laser points from a laser device onto a surface of a conveyor belt;
   capturing a plurality of first images of the surface of the conveyor belt by an imaging device during a first cycle of the conveyor belt;
   creating a first three-dimensional image of the surface of the conveyor belt during the first cycle based on the plurality of first images captured by the imaging device, each of a plurality of locations of the surface of the conveyor belt in the first three-dimensional image being assigned first position data;
   capturing a plurality of second images of the surface of the conveyor belt by the imaging device during a second cycle of the conveyor belt;
   creating a second three-dimensional image of the surface of the conveyor belt during the second cycle based on the plurality of second images captured by the imaging device, each of the plurality of locations of the surface of the conveyor belt in the second three-dimensional image being assigned second position data;
   determining whether a difference between the first position data and the second position data of one or more of the plurality of locations of the surface of the conveyor belt exceeds a predetermined threshold; and
   detecting the defect in response to determining the difference between the first position data and the second position data of one or more of the plurality of locations of the surface of the conveyor belt exceeds the predetermined threshold.

2. The method of claim 1, further comprising comparing the first three-dimensional image with the second three-dimensional image to determine whether the difference between the first position data and the second position data of one or more of the plurality of locations of the surface of the conveyor belt exceeds the predetermined threshold.

3. The method of claim 1, further comprising:
   determining the first position data based on a distance of the plurality of laser points during the first cycle; and
   determining the second position data based on a distance of the plurality of laser points during the second cycle.

4. The method of claim 3, wherein the distances are determined by the imaging device.

5. The method of claim 4, wherein the imaging device comprises a laser distance meter.

6. The method of claim 1, further comprising mounting the imaging device and the laser device onto a frame extending from a pair of rails on opposite sides of the conveyor belt.

7. The method of claim 1, further comprising emitting the laser from the laser device to extend along an entire width of the surface of the conveyor belt.

8. The method of claim 1, further comprising providing a notification that the defect is detected in response to determining that the difference between the first position data and the second position data of one or more of the plurality of locations of the surface of the conveyor belt exceeds the predetermined threshold.

9. The method of claim 8, wherein the notification is provided on a display device identifying a location of the defect on the surface of the conveyor belt.

10. The method of claim 1, further comprising:
    directing an additional laser device and an additional imaging device at an opposite surface of the conveyor belt; and
    adjusting the first position data and the second position data based on position data determined by the additional laser device and the additional imaging device at the plurality of locations of the conveyor belt.

11. The method of claim 1, further comprising:
assigning a first vertical distance to the first position data and a second vertical distance to the second position data;
in response to determining that the second vertical distance is greater than the first vertical distance by the predetermined threshold, activating a notification indicating that a defect has been detected; and
in response to determining that the second vertical distance is less than the first vertical distance by the predetermined threshold, activating a notification indicating that an object different than the defect has been detected.

12. A method for measuring a thickness of a conveyor belt, the method comprising:
emitting a first laser providing a plurality of first laser points from a first laser device onto a first surface of the conveyor belt;
detecting a first distance between each of the plurality of first laser points on the first surface of the conveyor belt and a first imaging device;
emitting a second laser providing a plurality of second laser points from a second laser device onto a second surface of the conveyor belt opposite the first surface of the conveyor belt;
detecting a second distance between each of the plurality of second laser points on the second surface of the conveyor belt and a second imaging device;
assigning a lateral position and a longitudinal position to each of the plurality of first laser points and each of the plurality of second laser points; and
determining whether a sum of the first distance and the second distance of at least one of the first laser point and a corresponding second laser point exceeds a threshold distance.

13. The method of claim 12, wherein:
the lateral position of each of the plurality of first laser points is based on a distance between an edge of the conveyor belt and each of the first laser points;
the longitudinal position of each of the plurality of first laser points is based on a distance from a starting point of the conveyor belt;
the lateral position of each of the plurality of second laser points is based on a distance between the edge of the conveyor belt and each of the second laser points; and
the longitudinal position of each of the plurality of second laser points is based on a distance from the starting point of the conveyor belt.

14. The method of claim 12, further comprising matching each of the plurality of first laser points to a corresponding one of the plurality of second laser points having an associated lateral position and an associated longitudinal position.

15. The method of claim 12, further comprising:
capturing a plurality of first images of the first surface of the conveyor belt by the first imaging device;
detecting the first distance between each of the plurality of first laser points on the first surface of the conveyor belt and the first imaging device based on the plurality of first images;
capturing a plurality of second images of the second surface of the conveyor belt by the second imaging device; and
detecting the second distance between each of the plurality of second laser points on the second surface of the conveyor belt and the second imaging device based on the plurality of second images.

16. The method of claim 12, further comprising determining the longitudinal position of each laser point based on a timestamp at which an image of the conveyor belt is captured by the first imaging device and a known speed of the conveyor belt.

17. A conveyor belt thickness measurement system comprising:
a first laser device emitting a plurality of first laser points onto a first surface of a conveyor belt;
a first imaging device determining a first distance between the plurality of first laser points and the first imaging device;
a second laser device emitting a plurality of second laser points on a second surface of the conveyor belt opposite the first surface of the conveyor belt;
a second imaging device determining a second distance between the plurality of second laser points and the second imaging device; and
a controller configured to:
determine whether a sum of the first distance and the second distance of at least one of the first laser point and a corresponding second laser point exceeds a threshold distance; and
assign a lateral position and a longitudinal position to each of the plurality of first laser points and each of the plurality of second laser points.

18. The conveyor belt thickness measurement system of claim 17, wherein:
the lateral position of each of the plurality of first laser points is based on a distance between an edge of the conveyor belt and each of the first laser points;
the longitudinal position of each of the plurality of first laser points is based on a distance from a starting point of the conveyor belt;
the lateral position of each of the plurality of second laser points is based on a distance between the edge of the conveyor belt and each of the second laser points; and
the longitudinal position of each of the plurality of second laser points is based on a distance from the starting point of the conveyor belt.

19. The conveyor belt thickness measurement system of claim 17, wherein the controller is configured to:
match each of the plurality of first laser points to a corresponding one of the plurality of second laser points based on an associated lateral position and an associated longitudinal position.

20. The conveyor belt thickness measurement system of claim 17, wherein the controller is configured to:
provide a notification that a defect is detected in response to determining that the sum of the first distance and the second distance of at least one of the first laser point and a corresponding second laser point exceeds the threshold distance, the notification identifying on a display device a location of the defect on the conveyor belt.

* * * * *